United States Patent [19]

Kitauchi

[11] Patent Number: 4,467,616
[45] Date of Patent: Aug. 28, 1984

[54] TEMPERATURE CONTROL SYSTEM FOR AN AIR CONDITIONER

[75] Inventor: Hajime Kitauchi, Nagasaki, Japan

[73] Assignee: Mitsubishi Denki Kabushiki Kaisha, Tokyo, Japan

[21] Appl. No.: 537,159

[22] Filed: Sep. 30, 1983

Related U.S. Application Data

[63] Continuation of Ser. No. 353,211, Mar. 1, 1982, abandoned.

[30] Foreign Application Priority Data

Mar. 3, 1981 [JP] Japan .................................. 56-30903

[51] Int. Cl.$^3$ ............................ H02J 1/00; F25B 7/00
[52] U.S. Cl. .................................. 62/175; 236/1 EA; 307/39
[58] Field of Search ............... 236/1 EA; 62/175; 165/26; 307/39

[56] References Cited

U.S. PATENT DOCUMENTS 4,172,555 10/1979 Levine .............................. 236/46 R
4,265,299 5/1981 Harnish ................................ 165/12

FOREIGN PATENT DOCUMENTS 15346 5/1976 Japan .

Primary Examiner—William E. Wayner
Attorney, Agent, or Firm—Wenderoth, Lind & Ponack

[57] ABSTRACT

The disclosed temperature control system for an air conditioner includes a sensor for sensing an actual air temperature and a comparator for determining the temperature difference between the sensed actual air temperature and a set air temperature after their conversion to digital voltages. The temperature difference is stored in a memory and is also applied to a calculator where a rate of change in temperature per unit time is calculated from the temperature difference thus formed and from that temperature which had occurred just before a predetermined time stored in the memory. A control unit responds to both the temperature difference and the rate of change in temperature per unit time to increase or decrease the number of compressors put into operation with respect to the number of the compressors operated at the just preceeding interval of time.

6 Claims, 6 Drawing Figures

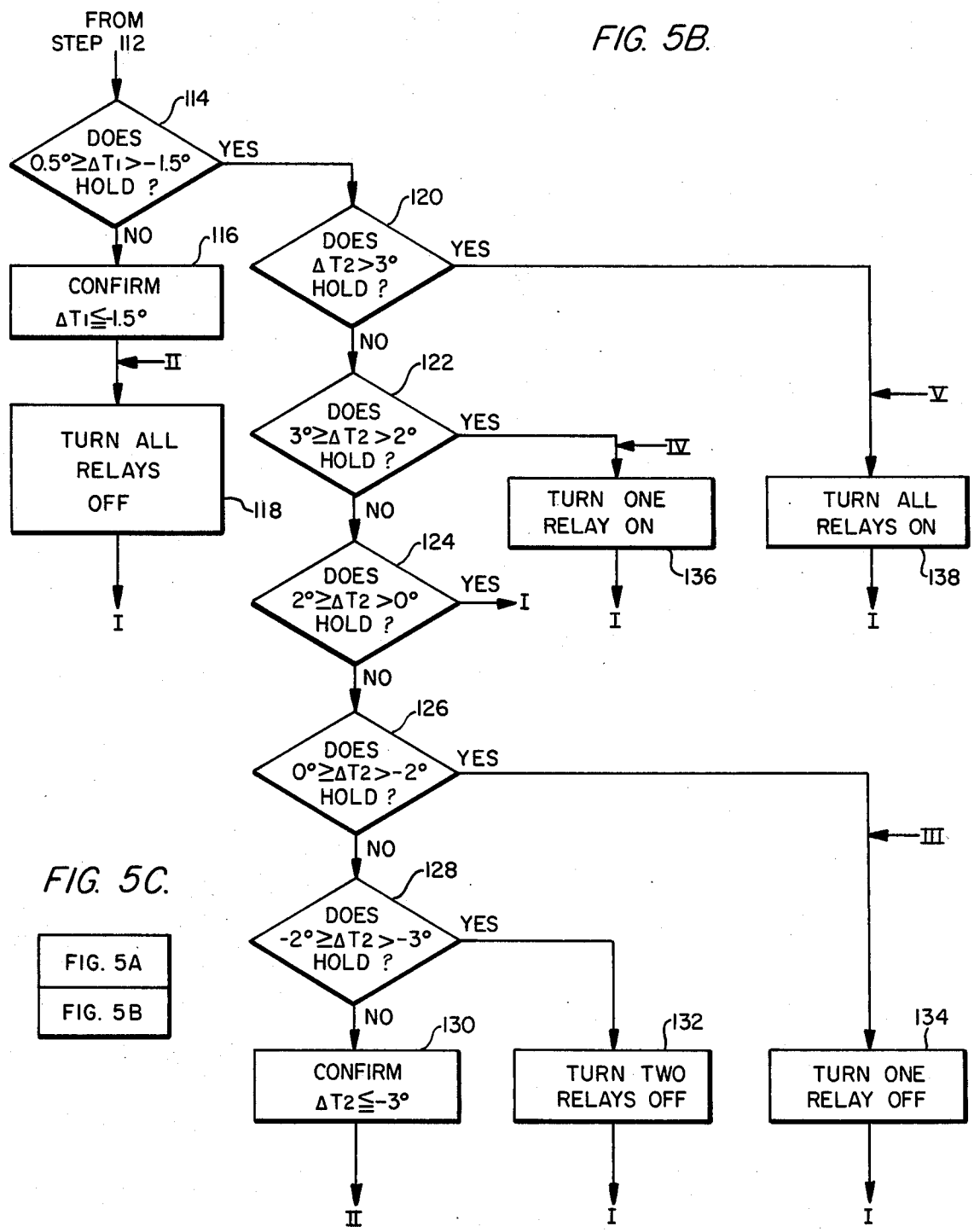

TEMPERATURE CONTROL SYSTEM FOR AN AIR CONDITIONER

This application is a continuation, of now abandoned application Ser. No. 353,211, filed Mar. 1, 1982.

BACKGROUND OF THE INVENTION

This invention relates to a temperature control system for an air conditioner.

There are known air conditioners of the type comprising a pair of compressors arranged so as to be successively respectively started and stopped in response to the closure and opening of a low and a high temperature contact set included in a temperature regulator. Thus, the temperature regulator has been responsive to only an air conditioned temperature so as to start and stop the compressors in a stepped manner with the result that an associated room becomes too warm or cold. This is because the low and high temperature contact sets have a temperature differential between temperatures at which they are closed are respectively opened. Therefore, such air conditioners have been unable to provide comfort and electric power savings. If a decrease in the temperature differential is attempted in order to reduce the lack of comfort and increase the power savings, then the compressors require very frequent starting and stopping as a result. Thus, this measure has been limited to some extent.

When a mechanical thermostat is used, each of mechanical switches involved have been operated with a force due to a temperature. Thus, the temperature differential in starting temperatures at which the switches are turned on can generally be varied by moving the positions of the particular mechanical switches but the stopping temperatures at which the switches are turned off are fixed. When the number of associated contact sets increases, it has been troublesome to adjust those temperatures at which the contact sets are put in their closed position.

Furthermore, when an electronic thermostat is used, the thermostat has, in many cases, operated so as to resemble an analog comparator which converts a change in temperature to a corresponding voltage and then determines the magnitude of the converted voltage. Therefore, an increase in the number of contact sets has been disadvantageous in that the temperature difference as described above is not only required to be adjusted in a complicated manner but also the resulting structure become physically large.

SUMMARY OF THE INVENTION

Accordingly, it is an object of the present invention to provide a new and improved temperature control system for air conditioners which are improved in their ability to provide comfortable temperatures by controlling a plurality of compressors in such a manner that the control rapidly follows a large change in temperature and slowly follows a small change in temperature.

It is another object of the invention to provide the temperature control system of the type as described in the preceding paragraph including improved means for changing the number of compressors put in operation with an inexpensive structure, and without the necessity of effecting the troublesome adjustment in the case where the number of associated contact sets is increased or decreased.

The present invention provides a temperature control system for an air conditioner having a plurality of air conditioning stages, which system comprises: a sensor means for sensing an actual temperature of air conditioned air, a memory means for storing the sensed actual temperature therein, a calculating means for calculating a rate of change in temperature from the sensed actual temperature of the air and an actual temperature which occurred before a predetermined time interval stored in the memory means, and a determination means for determining the number of operating air conditioning stages in accordance with a set temperature for the air conditioned air, the sensed actual air temperature and the rate of change in temperature. The determination means determines the number of operating air conditioning stages based on M temperature points and N rates of change of temperature, M and N being integers, said determination means thereby having M X N combinations of determination criteria.

Preferably, the determination means may be operative to determine the number of operating air conditioning stages in accordance with a deviation of the actual air temperature from the set air temperature and the rate of change in temperature.

BRIEF DESCRIPTION OF THE DRAWING

The present invention will become more readily apparent from the following detailed description taken in conjunction with the accompanying drawings in which:

FIGS. 5A and 5B are combined together as shown in FIG. 5C to show a flow chart for programming the operation of the arrangement shown in FIG. 4.

DESCRIPTION OF THE PREFERRED EMBODIMENT

Figure 1:
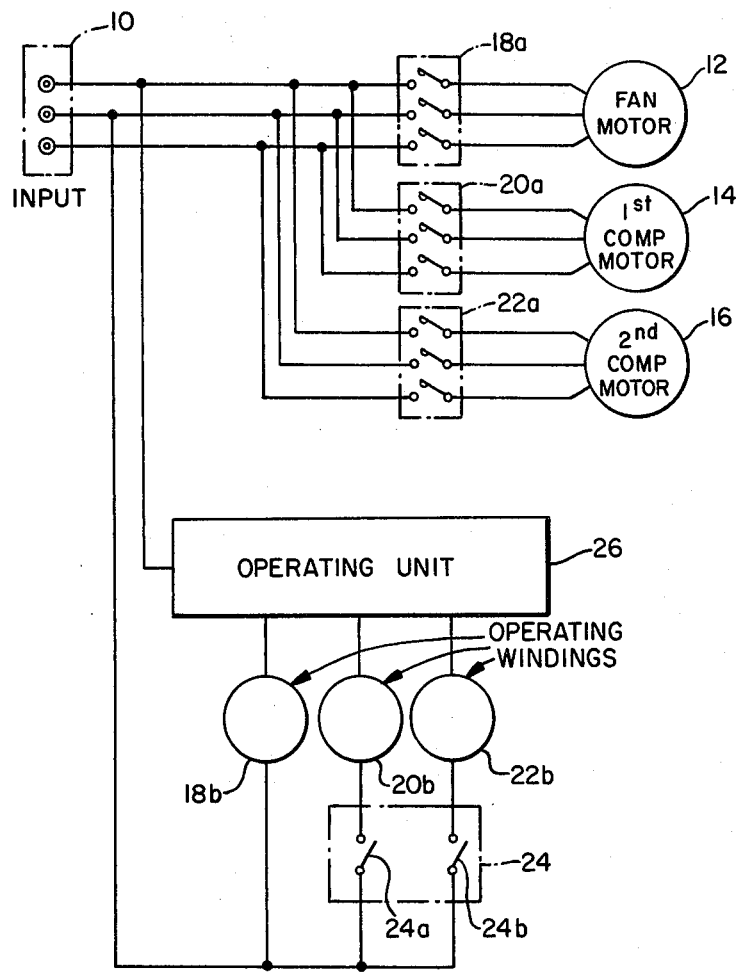
FIG. 1 is a wiring diagram of an electric circuit used with a conventional air conditioner.

Referring now to FIG. 1 of the drawings, there is illustrated an electric circuit used with conventional air conditioners. The illustrated arrangement comprises an input unit 10 for a three-phase AC source connected to three-phase electric motors 12, 14 and 16 which are used for a fan, a first compressor and a second compressor (not shown); the source is connected to the motors through three normally open three-phase contact sets 18a, 20a and 22a of associated electromagnetic contactors (not shown), said contactors respectively having their own operating windings 18b, 20b and 22b.

The input unit 10 is also connected to the operating winding 18b, and to low and high temperature contact sets 24a and 24b of a temperature regulator 24, said contact sets being normally put in their open position. The operating winding 18b is connected to an operating unit 26 and the normally open contact sets 24a and 24b are also connected to the operating unit 26 through the operating windings 20b and 22b respectively.

The normally open contacts sets 18a, 20a and 22a are responsive to the energization of the mating operating windings 18b, 20b and 22b so as to be closed, thereby enabling the operation of the associated motors 12, 14 and 16 so as to respectively drive the fan (not shown) and the first and second compressors (not shown).

Figure 2:
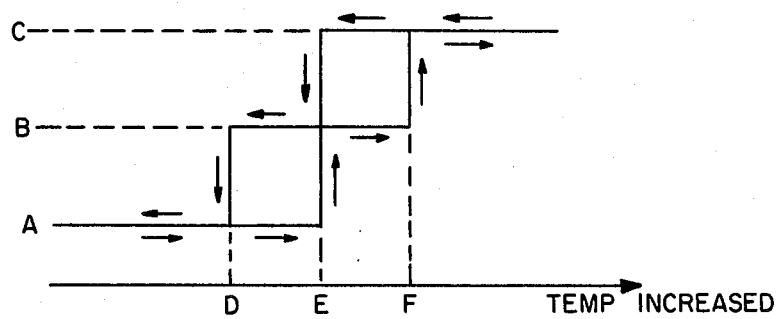
FIG. 2 is a graph illustrating the sequence control of the temperature regulator shown in FIG. 1.

FIG. 2 shows the sequence control of a conventional temperature regulator such as that shown in FIG. 1. In FIG. 2, the axis of the abscissa represents the temperature of air conditioned air and the axis of the ordinate represents the operating status of the air conditioners during the cooling operation. In FIG. 2, the reference characters A, B and C respectively designate 0%, 50%, and 100% of the operating states thereof. At the point A, the temperature regulator 24 has the low and high temperature contact sets 24a and 24b put in their own position to maintain the first and second compressor motors 14 and 16 so as to be inoperative, thereby resulting in the 0% operating state. At the point B, the temperature regulator 24 has the low temperature contact set 24a put in its closed position and the high temperature contact set 24b maintained in its open position. Thus, only the first compressor motor 14 is turned on to put the first compressor in operation and the second compressor motor 16 is held in its OFF state to maintain the second compressor so as to be inoperative, resulting in the 50% operating state. At the point C, the temperature regulator 24 has the low and high temperature contact sets 24a and 24b put in their closed position so as to operate the first and second compressor motors 14 and 16 to thereby drive the first and second compressors, resulting in the 100% operating state.

Furthermore, the low temperature contact set 24b is arranged to be put in its open position at a point E where the high temperature contact set 24b is put in its open position. The high temperature contact set 24b is arranged to be put in its closed position at a point F. Thus, the low temperature contact set 24a is operative during a temperature difference extending between the points D and E and the high temperature contact set 24b is operative during a temperature difference extending between the points E and F. In other words, each of the contact sets 24a or 24b is operative with a hysteresis.

The operation of the arrangement shown in FIG. 1 will now be described with reference to FIG. 2. When the air conditioning requirements are established in the operating unit 26, the operating winding 18b of the electromagnetic contactor for the fan is energized to put the associated normally open contact set 18a in its closed position to turn on the fan motor 12 so as to only drive the fan (not shown). Thus, the 0% operating state A results.

When the air conditioned air temperature rises to the point E as shown in FIG. 2, the low temperature contact set 24a of the temperature regulator 24 is put in its closed position to energize the operating winding 20b of the electromagnetic contactor for the first compressor. The energization of the operating winding 20b causes the closure of the mating contact sets 20a resulting in the driving of the electric motor 14 and therefore of the first compressor (not shown). Thus, the 50% operating state B is entered.

The temperature is further raised to the point F shown in FIG. 2 whereupon the high temperature contact set 24b of the temperature regulator 24 is put in its closed position. This closure of the high temperature contact set 24b causes the energization of the operating winding 22b of the associated electromagnetic contactor 24 resulting in the clsoure of the mating contact sets 22a. Therefore, the electric motor 18 is turned on to drive the second compressor (not shown) resulting in the 100% operating state C.

During a descrease in the air conditioned temperature, the high temperature contact set 24b of the temperature regulator 24 is opened at the point E to deenergize the operating winding 22b for the second compressor. This results in the turn-off of the electric motor 18 and therefore the stoppage of the second compressor. When the temperature is further decreased to the point D, the low temperature contact set 24a of the temperature regulator 24 is opened to deenergize the operating winding 20b for the first compressor. As a result, the mating contact sets 20a is opened to turn electric motor 14 off. Thus, the first compressor is stopped resulting in the 0% operating state A.

From the foregoing it is seen that the conventional temperature regulator is only responsive to the air conditioned temperature to control the operation of the compressors. This measure results in disadvantages with respect to comfort and electric power saving. For example, with a large change in temperature, the compressor is not driven until the temperature reaches some magnitude during a temperature rise. Thus, an associated room becomes too warm. On the contrary, the compressor is not stopped until the temperature descreases to some magnitude during a temperature drop. Therefore, the room is cooled too much.

In order to reduce these disadvantages, the contact sets of the temperature regulator might be designed and constructed so that the hysteresis or the temperature difference between the closure and opening thereof is small. This measure has caused the compressor to be very frequently started and stopped. Thus, this measure has had a limit.

There are also known temperature regulators of the type comprising a mechanical thermostat which utilizes a force due to a temperature to turn an associated switch or switches on. For the mechanical thermostat, the temperature differentials in starting temperatures can generally be varied by moving the positions of the mechanical switches, but the stopping temperatures are generally fixed. When the number of associated contact sets increases, it has been troublesome to adjust those temperatures at which the contact sets are put in their closed position.

Further known electronic thermostats have been in many cases, operated to resemble an analog comparator which converts a change in temperature to a corresponding voltage and then determines the magnitude of the converted voltage. Therefore, an increase in the number of contact sets has been disadvantateous in that the temperature difference is not only required to be adjusted in a complicated manner but also the resulting structure becomes physically large.

The present invention contemplates the elimination of the disadvantatages of the prior art practice as described above by the provision of a temperature control system for an air conditioner utilizing both the air conditioned temperature and the rate of change thereof to control the starting and stopping of a plurality of associated compressors by rapidly following a large change in temperature and slowly following a small change in temperature, whereby the comfort with respect to temperature is increased. The present invention also provides a means in the temperature control system as described above for increasing or decreasing the number of compressors put into operation with respect to the number of compressors operated at the just preceding stage to thereby control the temperature with an inexpensive structure and without the necessity of effecting any troublesome adjustments even in the case where the number of associated contact sets is increased or decreased.

Figure 3:
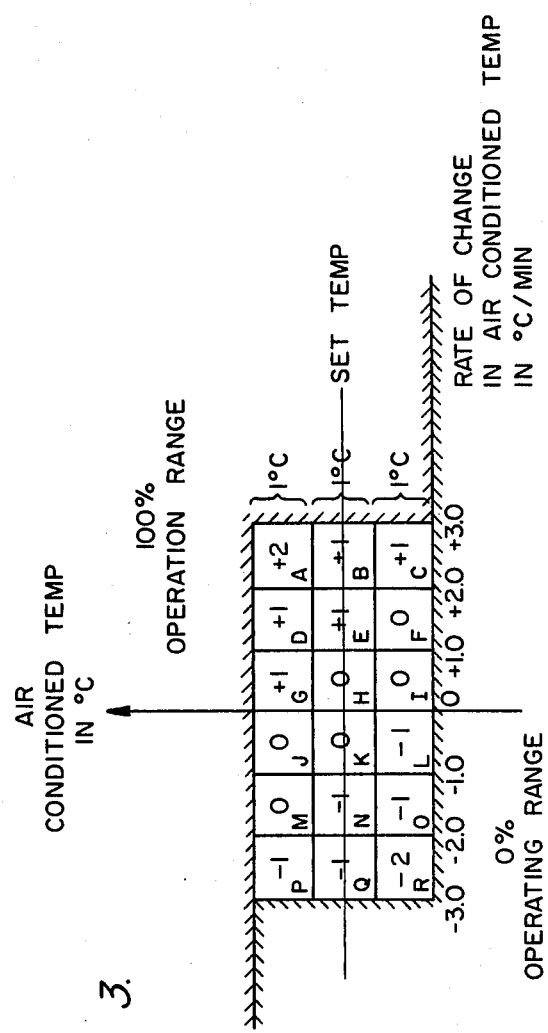
FIG. 3 is a graph illustrating by way of example, the sequence control for the temperature regulation according to the present invention.

Referring now to FIG. 3, there is illustrated by way of example, the sequence control for the temperature regulation according to the temperature control system of the present invention during the cooling of an associated room. In FIG. 3, the axis of the ordinate represents an air conditioned temperature and the axis of the abscissa represents a rate of change in the air conditioned temperature. As shown in FIG. 3, a control region is divided into three horizontal parallel zones each having a width of 1° C. and also into six vertical parallel zones each having a width of 1° C. per minute. A set temperature is represented by a horizontal line centrally passing through an intermediate one of the horizontal zones and the region plus and minus 1.5° C. above and below the set temperature defines a control region of the temperature. At any temperature not less than the sum of the set temperature in degrees centigrade and 1.5° C., all of the compressors are put in operation but at any temperature not higher than the set temperature in degrees centigrade minus 1.5° C., all of the compressors are maintained so as to be inoperative.

A vertical line centrally passing through the six vertical zones represents a zero rate of change in temperature per minute and the rates of change in temperature per minute are respectively positive and negative on the righthand and lefthand sides of the vertical line. Thus, the temperature is also controlled between plus and minus 3° C. per minute.

Accordingly, all of the compressors are put in operation when the temperature is raised with a rate of change in temperature of not less than 3° C. per minute while all the compressors are stopped when the temperature drops with a rate of change in temperature of not less than 3° C. per minute.

In FIG. 3, 3×6=18 sub-zones are shown and labelled with the reference characters A through R. The sub-zones are designated with the numerals 0, 1 or 2 indicating the number of operated compressors which are increased with a plus sign and decreased with a minus sign. For example, +2 designated in the sub-zone A means that the number of operated compressors are increased by two in sub-zone A as compared with the just preceding sub-zone.

The operation according to FIG. 3 will now be described. It is assumed that an associated room is now at 25.5° C. and a set temperature is of 27° C. with no compressor operated. Assuming that the temperature of the room is raised to 26° C. after one minute, the room has an actual temperature of 26° C. which is 1° C. less than the set temperature and the rate of change in temperature is of 0.5° C. per minute. Thus, the sub-zone I is entered, wherein the number of compressors put into operation remains at zero. Then, assuming that 27.2° C. is reached after one minute, the present temperature is equal to the set temperature plus 0.2° C. and a rate of change in temperature is of 1.2° C. per minute. Thus, the sub-zone E is entered, wherein a single compressor is put into operation. Furthermore, after one minute, it is assumed that 28° C. is reached. Under the assumed conditions, a rate of change in temperature is of 0.8° C. per minute, resulting in the entry of the sub-zone G. In that sub-zone, a compressor is put into operation. Thus, two compressors are now in operation.

Then assuming that, after one minute, 27.4° C. is reached due to the cooling effect of the associated air conditioner, a rate of change in temperature is of —0.6° C. Thus, the sub-zone K is entered, wherein the two compressors remain operated. Furthermore, one minute elapses until 26.3° C. is reached. At that time, the sub-zone O is entered and the number of operated compressors decreases to one.

Since the number by which the number of the compressors put into operation increases or decreases is expressed by a relative number, a command for increasing the number of the compressors put into operation is disabled during the operation of all of the compressors and a command for decreasing the number of the compressors put into operation is also disabled during the stoppage of all of the compressors.

Figure 4:
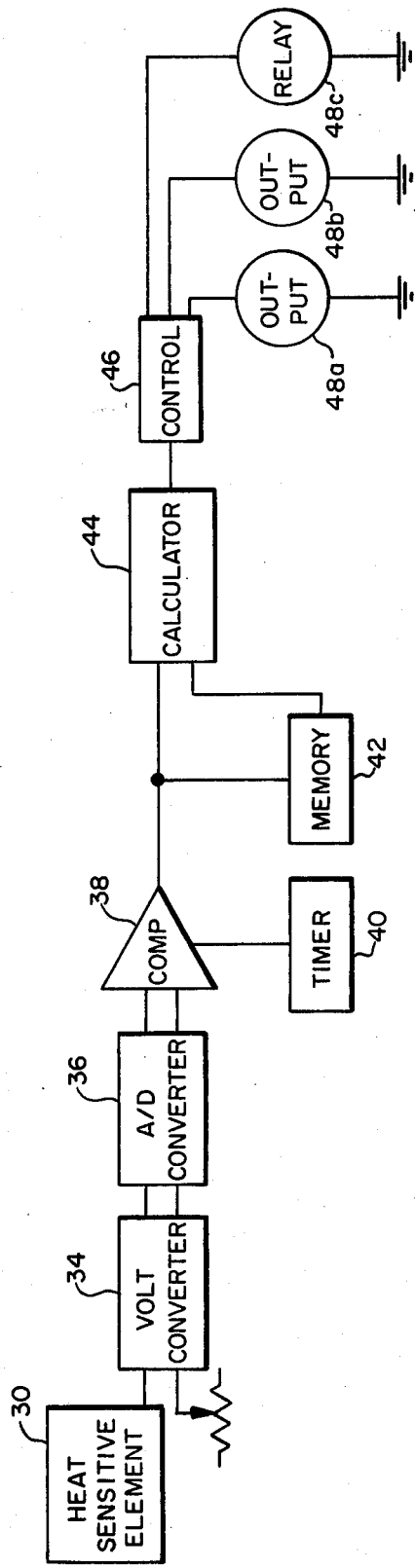
FIG. 4 is a block diagram of one embodiment according to the temperature control system of the present invention for an airconditioner.

FIG. 4 shows the embodiment according to the temperature control system of the present invention for controlling an air conditioned temperature in the manner as described above in conjunction with FIG. 3. The illustrated arrangement comprises a heat sensitive element 30 for sensing an air conditioned temperature, or the actual temperature a semi-fixed resistor 32 for setting an air conditioned temperature, a voltage converter 34 connected to both the heat sensitive element 30 and the semi-fixed resistor 32 to convert the sensed and set temperatures to corresponding voltages, an analog-to-digital converter 36 for converting the converted analog voltages to corresponding digital values and an operational amplifier type comparator 38 having a pair of inputs connected to the converter 36 and another input connected to a timer 40 for generating pulses at predetermined equal time intervals. The comparator 38 compares the sensed and set temperatures $T_{a1}$ and $T_s$ in digital form and outputs the difference between temperatures $T_{a1}$ and $T_s$ in synchronism with the pulses from the timer 14.

The output of comparator 38 is connected to both a memory 42 and a calculator 44 which is also connected to the output of the memory 42. The memory 42 has successively stored therein the initial values upon the closure of an associated electric source (not shown) and outputs from the comparator 38. Each time new data enters the memory 42, the latter clears old data stored therein up to that time. The calculator 44 calculates a difference $\Delta T_1$ between the actual temperature $T_{a1}$ and the set temperature $T_s$ and a rate of change $\Delta T_2$ in temperature per unit time or per minute from the outputs delivered by both the memory 42 and the comparator 38. Thus $\Delta T_2 = T_{a1} - T_{a2}$ where $T_{a2}$ designates an air conditioned temperature stored in the memory 42 before a predetermined time interval.

Then, a control unit 46 is responsive to outputs from the calculator 44 to selectively control a plurality of output relays, in this case, three output relays 48a, 48b and 48c.

Figure 5A:
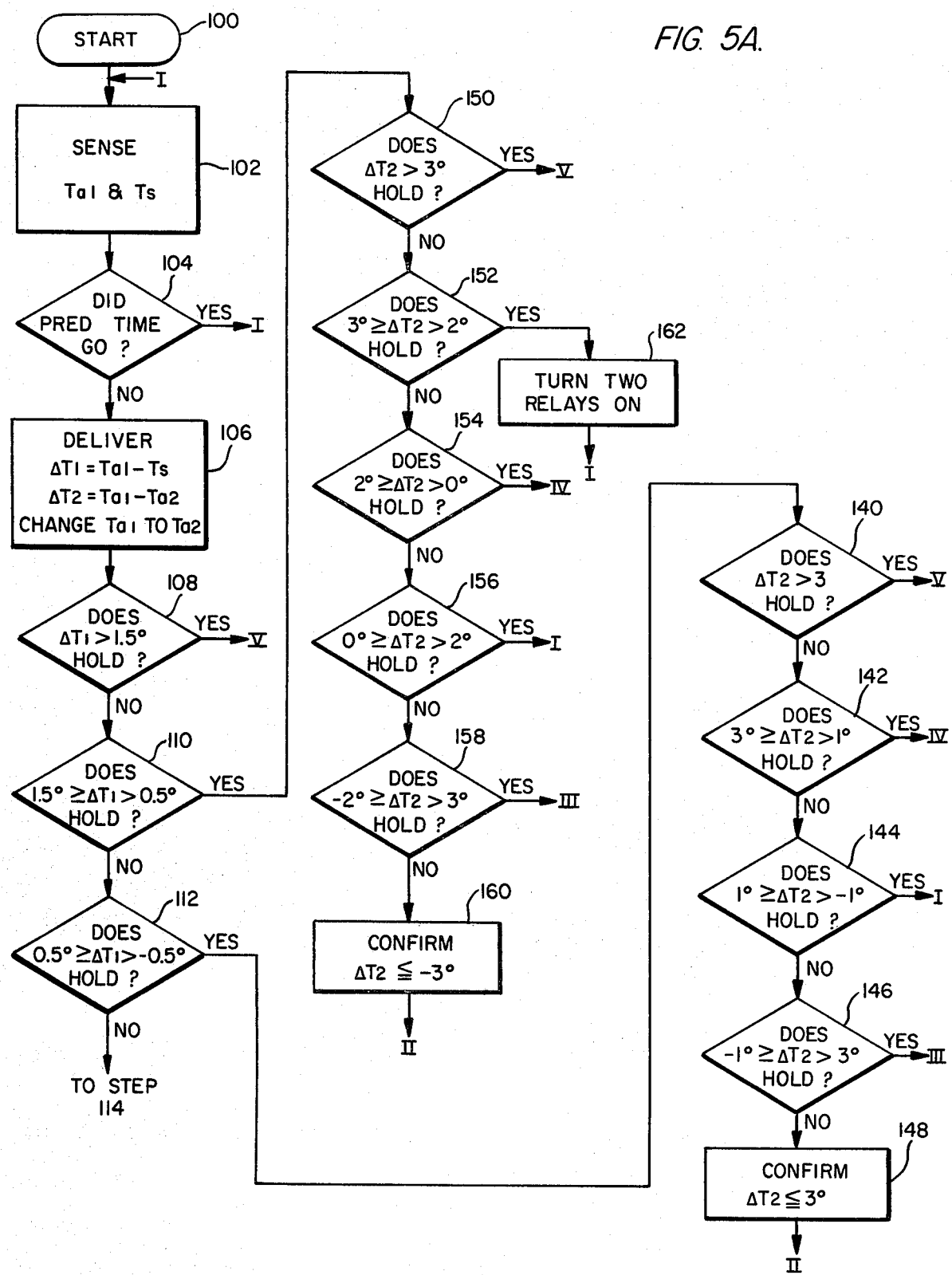

The operation of the arrangement shown in FIG. 4 will now be described in conjunction to FIG. 5 (i.e.— FIGS. 5A–5C) wherein there is illustrated a flow chart for programming the operation thereof. The program is started at the step 100 and then entered into at the step 102 where the heat sensitive element 30 senses the actual temperature of the air conditioned air, and the sensed actual temperature and the set temperature determined by the semi-fixed resistor 32 are converted to corresponding voltages which are entered into the comparator 38 after the conversion to digital values $T_{a1}$ and $T_s$ by the converter 36. Then, the step 104 is entered in order to determine if a predetermined time interval has passed. When that time interval has passed, as determined by the step 104 or when the timer 40 delivers output, the comparator 38 is not operated, resulting in the return-back to step 102 as shown by the reference numeral I. However, when the time interval has not passed, and the timer 40 delivers a pulse, then the step 106 is entered. In the step 106, the comparator 38 is operated to deliver $\Delta T_1 = T_{a1} - T_s$, and the calculator 44 calculates $\Delta T_2 = T_{a1} - T_{a2}$ through the addition of $\Delta T_1$ before the predetermined time interval from the memory 42 as follows: $\Delta T_1$ (at the present time) $-\Delta T_1$ (before the predetermined time interval) $= T_{a1} - T_s - (T_{a2} - T_s) = T_{a1} - T_{a2}$ assuming that $T_s$ remains unchanged. Furthermore, the new $\Delta T_1$ is entered into the memory 42 whereupon the memory 42 clears the old $\Delta T_1$ stored therein up to that time.

Thereafter, the control unit 48 selectively controls the output relays 48a, 48b and 48c in accordance with the combination of $\Delta T_1$ and $\Delta T_2$. For example, if $\Delta T_1$ does not meet the requirements specified in the succeeding steps 108, through 114 respectively, as shown in FIGS. 5A and 5B, then the step 116 is entered to confirm that $\Delta T_1 \leq -1.5°$ C. Thereafter, all the output relays 48a, 48b and 48c are turned off in the step 118 to stop all the associated compressors, after which the program is returned back to the step 102 as shown by the reference numeral I.

If $\Delta T_1$ does not meet the requirements specified respectively in the steps 108, 110 and 112 and if $0.5°$ C. $\geq \Delta T_1 > -1.5°$ C., as determined in the step 114, then the program enters the step 120 after which $\Delta T_2$ is successively examined in the steps 120 through 128 in the named order. More specifically, if $\Delta T_2$ does not meet the requirements specified in those steps respectively, as shown in FIG. 5B, then the step 130 confirms that $\Delta T_2 \leq -3°$ C. Then, the step 118 is entered, as shown by the reference numeral II in FIG. 5B, to turn all the relays off as described above.

If $-2°$ C. $\geq \Delta T_2 > -3°$ C., as determined in the step 128, then the two relays are turned off in the step 132 to stop the associated compressors, after which the program is returned back to the step 102. Similarly, if $0°$ C. $\geq \Delta T_2 > -2°$ C., as determined in the step 126, then the step 134 is entered to turn one output relay off resulting in the stoppage of its associated compressor. Then, the program is returned back to the step 102. Furthermore, if $2°$ C. $\geq \Delta T > 0°$ C., as determined in the step 124, then the program is returned back to the step 102.

If $3°$ C. $\geq \Delta T_2 > 2°$ C., as determined in the step 122, then one output relay is turned on in the step 136 to start its associated compressor. This is followed by the step 102. If $\Delta T_2 > 3°$ C., as determined in the step 120, then all of the output relays 48a, 48b and 48c are turned on in the step 138, resulting in the start of all the compressors. Then, the step 102 is entered.

If $0.5°$ C. $\geq \Delta T_1 > -0.5°$ C., as determined in the step 112, then $\Delta T_2$ is successively examined in the succeeding steps 140 through 146 in the named order. More specifically, if $\Delta T_2 > 3°$ C., as determined in the step 140, then the program enters the step 138 as described above. If $\Delta T_2 \leq 3°$ C., then the step 142 determines if $3°$ C. $\geq \Delta T_2 > 1°$ C., and if so, the program enters the step 136 as described above. Otherwise, the step 144 is entered to determine if $1°$ C. $\geq \Delta T_2 > -1°$ C., and if so, the program is returned back to the step 102. Otherwise, the step 146 is entered. When $\Delta T_2$ is determined to meet the requirements, $-1°$ C. $\geq \Delta T_2 > -3°$ C., as specified in the step 146, the step 134 as described above is then entered. On the contrary, when $\Delta T_2$ is determined not to meet those requirements, the step 148 is entered to confirm that $\Delta T_2 \leq -3°$ C. Then, all of the output relays are turned off in the step 118, followed by the entry of the step 102.

If $\Delta T_1 > 1.5°$ C., as determined in the step 108, then the program enters the step 138 as described above.

If $1.5°$ C. $\geq \Delta T_1 > 0.5°$ C., as determined in step 110, then $\Delta T_2$ is successively examined in the succeeding steps 150 through 158. More specifically, when $\Delta T_2$ does not meet the requirements specified in those respective steps, as shown in FIG. 5A, then the step 160 confirms that $\Delta T_2 \leq -3°$ C., after which the step 118 as described above is entered. On the contrary, when $\Delta T_2$ meets the requirement specified respectively in the steps 150, 152, 154, 156 or 158, the program is respectively entered into in the step 138, 162, 136, 102 or 134 as described above, except for the step 162, where the two output relays are turned on. The step 162 returns the program back to the step 102.

If $-1.5°$ C. $> \Delta T_1 < +1.5°$ C. and $-3°$ C. $\leq \Delta T_2 < 3°$ C. respectively, then the control as shown in FIG. 3 is effected. For example, it is assumed that the control preceeds to pass through the sub-zones I, E, G, K and O in the named order. Under the assumed conditions, the program is executed to pass through the steps 102, 104, 106, 108, 110, 114, 120, 122, 124 and 102 in the named order, resulting in the completion of the control in the sub-zone I. Then, the program is executed to pass through the steps 102, 104, 106, 108, 110, 112, 140, 142, 136 and 102 in the named order. This describes the control in the sub-zone E. The control in the sub-zone G is successively effected in a series of steps 102, 104, 106, 108, 110, 150, 152, 154, 136 and 102. Furthermore, the control in the sub-zone K is successively effected in a series of steps 102, 104, 106, 108, 110, 112, 140, 142, 144 and 102. Finally, the control in the sub-zone O passes through the steps 102, 104, 106, 108, 110, 112, 114, 120, 122, 124, 126, 134 and 102 in the named order.

From the foregoing it is seen that, according to the present invention, the temperature regulation utilizes a function of both an air conditioned temperature and a rate of change in that temperature per unit time, to thereby control the start up and stoppage of the compressors involved. Thus, the resulting system can quickly follow a change in temperature and also control the number of the compressors put into operation by applying thereto a command signal to increase or decrease the number of compressors put into operation and in accordance with the flow chart shown in FIG. 5. Therefore, the present invention can control the operation of any desired number of compressors.

While the present invention has been illustrated and described in conjunction with a single preferred embodiment thereof, it is to be understood that numerous changes and modifications may be resorted to without departing from the spirit and scope of the present invention.

What is claimed is:

1. A temperature control system for an air conditioner having a plurality of air conditioning stages, said system comprising a sensor means for sensing an actual temperature of air conditioned air, a memory means for storing the sensed actual temperature therein, a calculating means for calculating a rate of change in temperature per unit time from the sensed actual temperature of the air and a previous actual air temperature which occurred before a predetermined time interval and which was stored in the memory means, and a determination means for determining the number of operating air conditioning stages in accordance with a set temperature for said air conditioned air, said sensed actual air temperature and said rate of change in temperature per unit time;

wherein said determination means includes means for determining said number of operating air conditioning stages based on m temperature points and n rates of change of temperature, m and n being integers, said determination means thereby having m×n combinations of determination criteria.

2. A temperature control system for an air conditioner as claimed in claim 1, wherein said determination means determines the number of operating air conditioning stages in accordance with a function of both said sensed actual air temperature and said rate of change in temperature per unit time.

3. A temperature control system for an air conditioner as claimed in claim 1, wherein said determination means determines the number of operating air conditioning stages in accordance with a deviation of said sensed actual air temperature from said set air temperature and said rate of change in temperature per unit time.

4. A temperature control system for an air conditioner as claimed in claim 1, wherein said determination means includes a means responsive to a large rate of change in temperature per unit time for increasing the number by which the number of operating air conditioning stages increases or decreases.

5. A temperature control system for an air conditioner as claimed in claim 2, wherein said determination means includes a means responsive to a large rate of change in temperature per unit time for increasing the number by which the number of operating air conditioning stages increases or decreases.

6. A temperature control system for an air conditioner as claimed in claim 3, wherein said determination means includes a means responsive to a large rate of change in termperature per unit time for increasing the number by which the number of operating air conditioning stages increases or decreases.

* * * * *